(12) United States Patent
Abe et al.

(10) Patent No.: US 6,866,201 B2
(45) Date of Patent: Mar. 15, 2005

(54) CARD READING WRITING TRANSPORTING AND RECYCLING DEVICE

(75) Inventors: Hiroshi Abe, Iwatsuki (JP); Minoru Enomoto, Iwatsuki (JP)

(73) Assignee: Asahi Seiko Co., Ltd., Tokyo (JP)

( * ) Notice: Subject to any disclaimer, the term of this patent is extended or adjusted under 35 U.S.C. 154(b) by 0 days.

(21) Appl. No.: 10/378,118

(22) Filed: Mar. 3, 2003

(65) Prior Publication Data

US 2003/0178494 A1 Sep. 25, 2003

(30) Foreign Application Priority Data

Mar. 4, 2002 (JP) ........................................ 2002-057148

(51) Int. Cl.⁷ ............................................... G06K 19/06
(52) U.S. Cl. ...................... 235/493; 235/492; 235/449; 235/380; 235/379
(58) Field of Search ................. 235/493, 492, 235/449, 380, 379, 441

(56) References Cited

U.S. PATENT DOCUMENTS

| | | | |
|---|---|---|---|
| 4,827,425 A | * 5/1989 | Linden | ...................... 700/225 |
| 4,833,310 A | * 5/1989 | Shimamura et al. | ........ 235/479 |
| 5,010,239 A | * 4/1991 | Mita | ........................... 235/441 |
| 5,912,446 A | * 6/1999 | Wong et al. | ................. 235/449 |
| 6,013,345 A | * 1/2000 | Koshida et al. | ................ 428/78 |
| 6,250,552 B1 | * 6/2001 | Hirasawa | ..................... 235/475 |
| 6,345,760 B1 | 2/2002 | Eason et al. | ................. 235/380 |

* cited by examiner

Primary Examiner—Steven S. Paik

(57) ABSTRACT

A card handling and recycling device, including a card receiving unit which can accept a card inserted into the device and optionally withdraw the card out of the device, a magnetic card reading and writing unit, a movable integrated circuit card reading and writing unit, and a card transporting unit for selectively moving the card within the card handling device along a card transporting passageway. The card receiving unit, magnetic card reading and writing unit, integrated circuit card reading and writing unit, and card transporting unit are aligned along the card transporting passageway. Recycling of cards is accomplished by pivoting the integrated circuit card handling unit so that a transported card will be deflected by a guide plate into a recycling storage area.

5 Claims, 4 Drawing Sheets

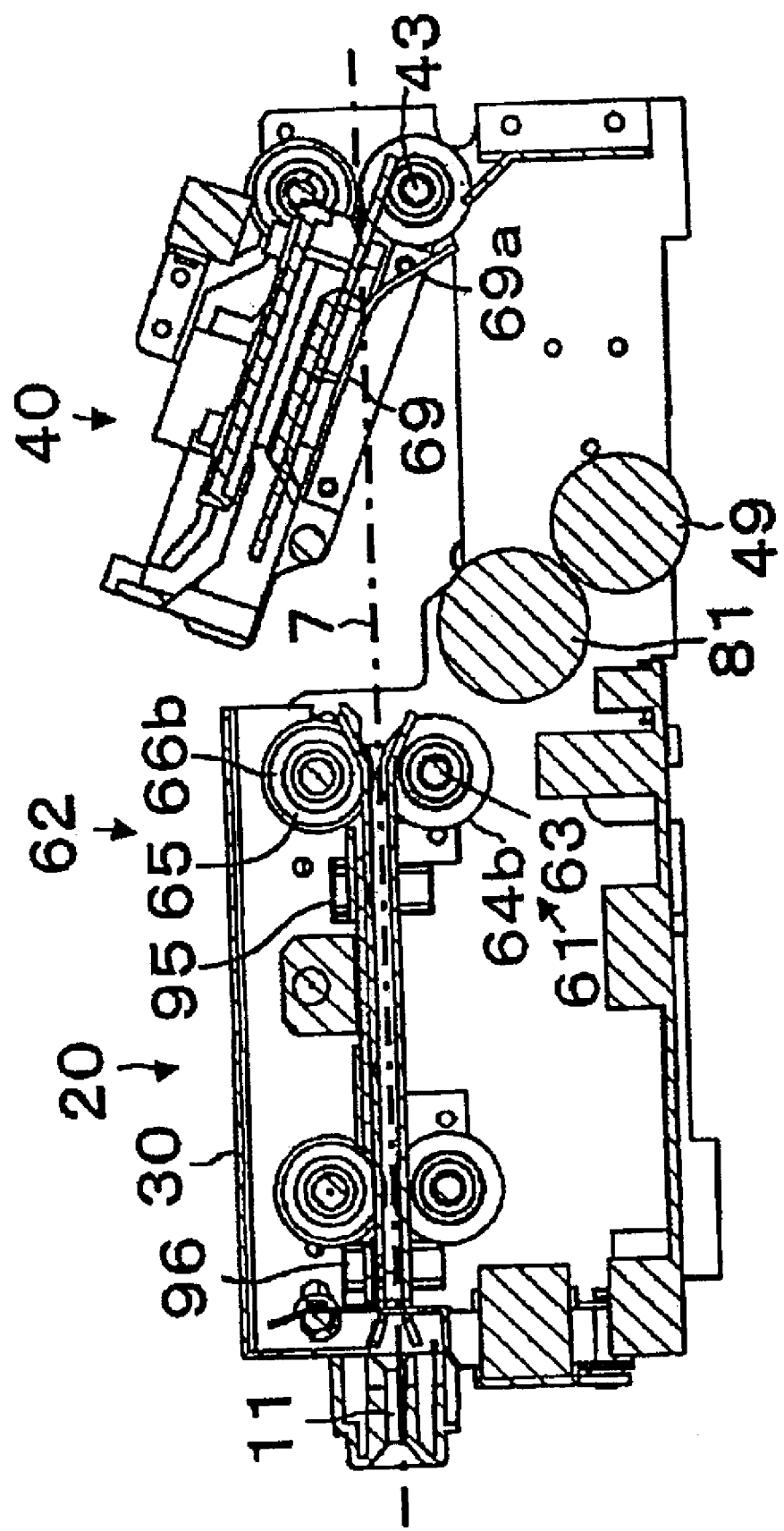

CARD READING WRITING TRANSPORTING AND RECYCLING DEVICE

This application is based on an application number 2002-057148 filed in Japan, the content of which is hereby incorporated by reference.

BACKGROUND OF THE INVENTION

1. Field of the Invention

The present invention relates to an improved card handling device for magnetic cards with one or more magnetic strips as well as integrated circuit bearing smart cards, hereinafter referred to as an integrated circuit card, or IC card, and a card recycling device. The present invention handles IC cards of either contact or non-contact access technologies.

2. Description of Related Art

A card handling device for magnetic cards and integrated circuit bearing cards is disclosed in Japanese Laid Open patent application No. 10-49725 and includes a card slot, magnetic card handling device, an IC card handling device, and a card storing device for both magnetic and IC cards. The guide of the magnetic card handling device pivots about an axis to allow the magnetic card to be drawn by gravity into a recycling unit.

In the prior art, a magnetic card handling device pivots a predetermined angle on the rotating shaft used as a drive in the card transporting device. The prior art discloses a compact structure, including both the card handling device and the card recycling device in one body.

However, this structure is complex making assembly and maintenance difficult because the rotating shaft for the transporting device is shared as the pivot axis of the magnetic handling device. The magnetic card occurs in two varieties denoted JIS-1 type (JIS-X-6302-1) and JIS-2 type (JIS-6302-2). The JIS-1 type has a magnetic strip on the reverse side of the card, while the JIS-2 type has a magnetic strip on the obverse side, or front face, of the card.

The magnetic heads for reading and writing are located facing the magnetic strips and may physically contact the magnetic strips. The magnetic heads are moveable in operation. The magnetic heads are located opposite from each other, grasping the card between the heads, and providing support for the grasped card to keep it from dropping.

If one of the heads moves, the card is released. If the magnetic heads touch each other without an intervening card present, the magnetic heads may be damaged. Some card handling devices are small in size allowing their use, for example, in ticket vending machines.

SUMMARY OF THE INVENTION

The present invention is directed to a card handling and recycling device.

The card handling and recycling device, includes a card receiving unit which can accept a card inserted from a position external to the device and optionally return the card to a position external to the device, a magnetic card reading and writing unit, a movable integrated circuit card reading and writing unit, a card recycling unit, and a card transporting unit for moving the card selectively within the card handling device along a card transporting passageway.

The card receiving unit, magnetic card reading and writing unit, integrated circuit card reading and writing unit, and card recycling unit are aligned along the card transporting passageway. The integrated circuit card handling unit pivots, block the card transporting passageway, and allowing a card traveling along the card transporting passageway to be diverted into a storage area for recycling the card.

The term card herein applies individually to a card with one or more magnetic strips, an IC card, a smart card, or other card which may be written to and read from using either contact or non-contact means. The phrase card handling comprehends card transporting as described herein, and includes reading and writing. Thus, a card handling and recycling device, or more simply card handling device, includes all aspects of the invention as herein described.

BRIEF DESCRIPTION OF THE DRAWINGS

The exact nature of this invention will be readily apparent from consideration of the following detailed description in conjunction with the accompanying drawings, wherein:

FIG. 4 is a cross-sectional view of the card handling and recycling device of the embodiment showing the device operated in the recycling mode;

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein to specifically provide a card handling and recycling device. The term card herein applies individually to a card with one or more magnetic strips, an IC card, a smart card, or other card or carrier which may be written to and read from using either contact or non-contact means.

Figure 1:
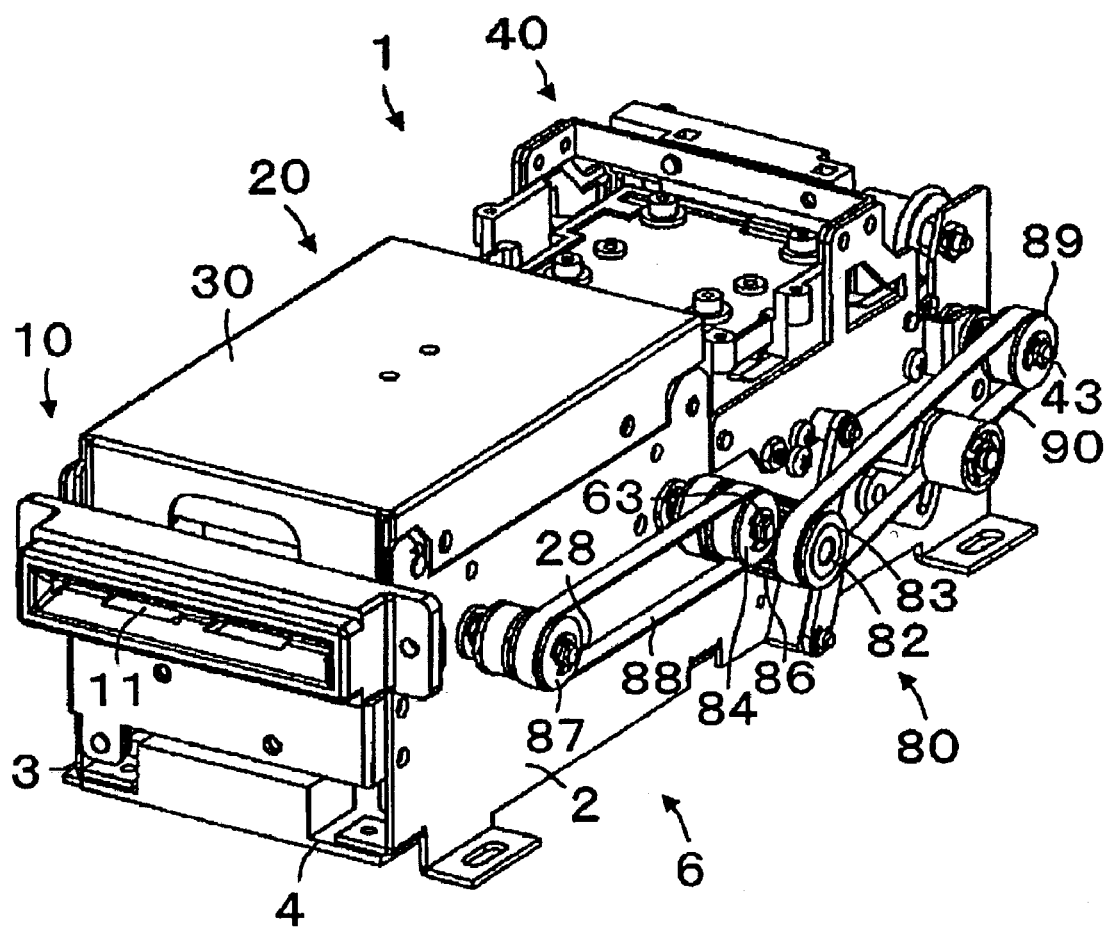
FIG. 1 is a perspective view of the card handling and recycling device of the embodiment.

Referring to the view of FIG. 1, the card handling device 1 includes a card receiving unit 10 with a rectangular slot 11, a magnetic card handling unit 20, an IC card handling unit 40, and a card transporting unit 59. The card handling device 1 has a frame 6 which includes side frame members 2 and 3, with cross frame members 4 and 5 mounted between side frame members 2 and 3.

Figure 3:
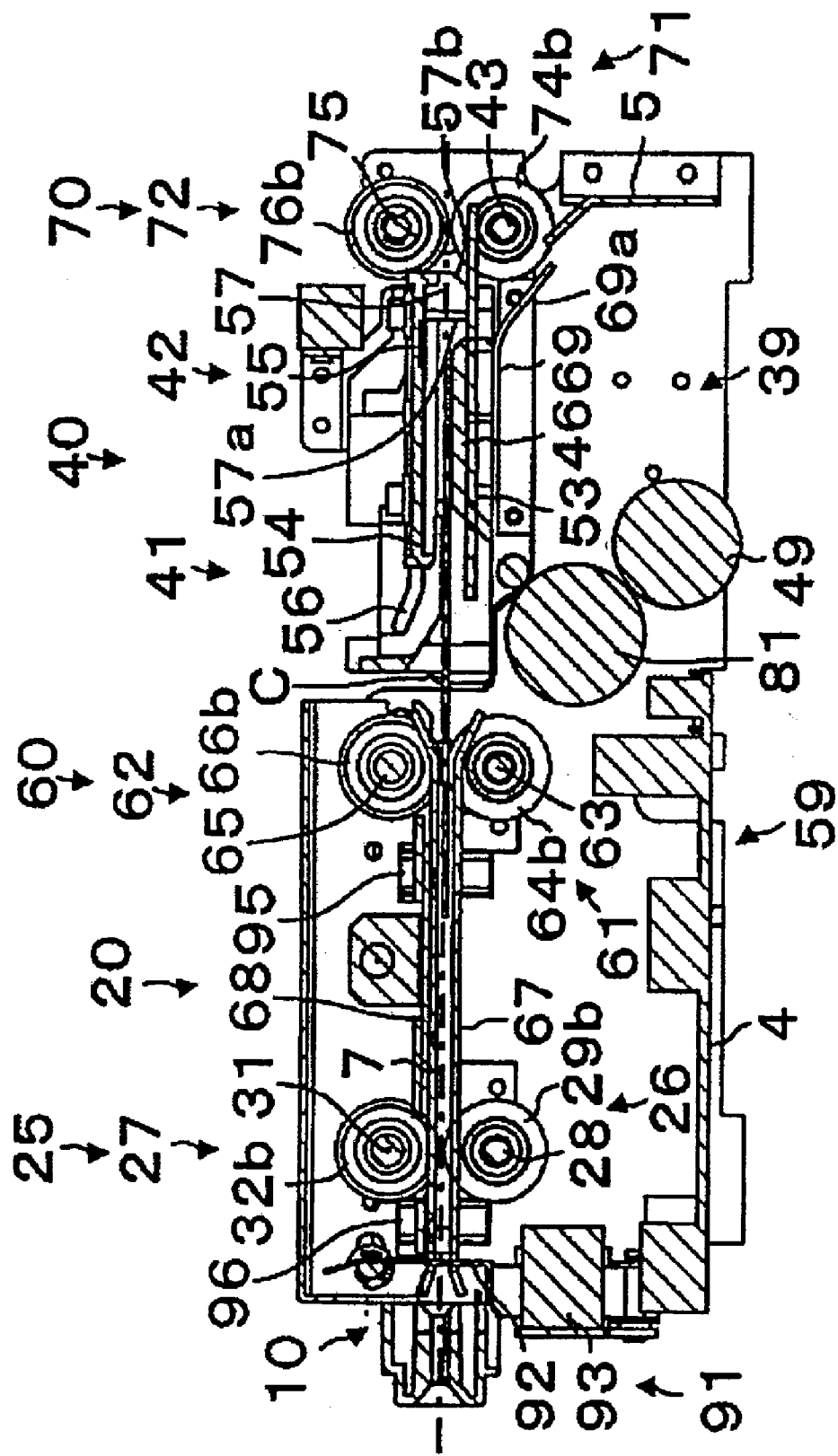
FIG. 3 is a cross-sectional view of the card handling and recycling device of the embodiment.

Referring to the view of FIG. 3, the card receiving unit 10, the magnetic card handling unit 20, and the IC card handling unit 40 are suitably aligned along a card transporting passageway 7.

Figure 2:
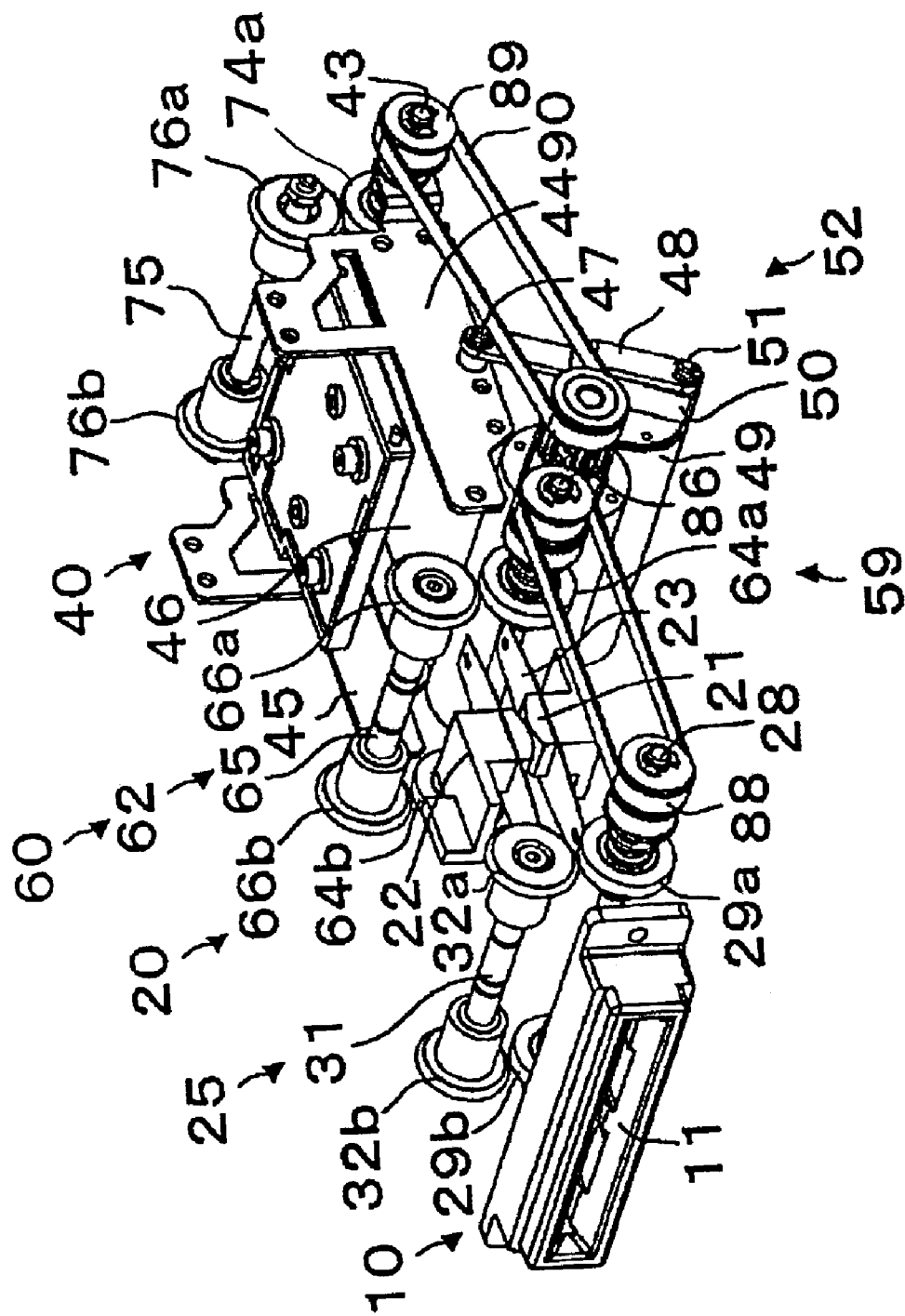
FIG. 2 is a perspective view of the card handling and recycling device the embodiment showing the internal configuration of components.

Referring to the view of FIG. 2, the magnetic card handling unit 20 is explained. The magnetic card handling device 20 includes a first magnetic head 21 which in this embodiment uses JIS-1 type cards and a second magnetic head 22 which uses JIS-2 type cards. Alternatively, the first magnetic head 21 and second magnetic head 22 maybe of either type, JIS-1 or JIS2, or they may both be the same type. In the case where only one magnetic head is present in an embodiment, the magnetic head may be of either type.

The first magnetic head 21 can read and write a magnetic strip on a magnetic card, and is fixedly carried near the middle of a lower leaf spring 23. One end of the lower leaf spring 23 is fixed at a bracket (not shown) and the other end can slide on the bracket. The lower leaf spring 23 is located below the transporting passageway 7 and is aligned so that the sliding end of the leaf spring slides along the direction as the passageway to maintain alignment of the magnetic head 21 with a magnetic card in the transporting passageway 7. The first magnetic head 21 is mounted so that, when a magnetic card is not presently located for reading or writing by at the magnetic head, the sensing portion of the first magnetic head extends upward slightly above the path traversed by the bottom edge of a magnetic card which is located for reading and writing by the first magnetic head.

The second magnetic head 22 can read and write a magnetic strip on a magnetic card, and is fixedly carried near the middle of an upper leaf spring 24. One end of the upper leaf spring 24 is fixed at a bracket (not shown) and the other end can slide on the bracket. The upper leaf spring 24 is located above the transporting passageway 7 and is aligned so that the sliding end of the leaf spring slides along the direction as the passageway to maintain alignment of the magnetic head 22 with a magnetic card in the transporting passageway 7. The second magnetic head 22 is mounted so that, when a magnetic card is not presently located for reading or writing by at the magnetic head, the sensing portion of the second magnetic head extends downward slightly below the path traversed by the upper edge of a magnetic card which is located for reading and writing by the second magnetic head.

The first magnetic head 21 and the second magnetic head 22 are located opposite to each other, and slightly displaced along the card transporting passageway 7 so that magnetic head 21 may contact magnetic head 22 without damage. The magnetic card handling unit 20 may contain either or both of magnetic head 21 or magnetic head 22, as a magnetic card reading and writing unit, so that magnetic cards of all types may be used.

The first transporting unit 25 is located along the card transporting passageway 7 between the card receiving unit 10 and either or both of magnetic head 21 or magnetic head 22. The first transporting unit 25 includes a first driving roller 26 which is located below the card transporting passageway 7 and a first pressing roller 27 which is located above the transporting passageway 7. The first driving roller 26 includes a first rotating shaft 28 which is supported near each end oppositely by side frame members 2 and 3. Upon first rotating shaft 28 are mounted rollers 29a and 29b which are fixed near opposite ends of first rotating shaft 28.

Rollers 29a and 29b each comprise a cylindrical body covered by a ring as an outer surface. The cylindrical body is composed of a harder substance like resin or metal, while the ring around the cylindrical body is composed of a softer material such as rubber. Because magnetic cards and IC cards are the same length and width but may have different thicknesses, the rubber on the rings can be changed to accommodate a desired card thickness. First pressing roller 27 provides resilient support so that cards of different thicknesses may be handled.

The first pressing roller 27 includes a shaft 31 which is fixed in a removable supporting box 30 and rollers 32a and 32b which are attached and rotate at the end of shaft 31. The composition of rollers 32a and 32b is the same as that of rollers 29a and 29b. Roller 32a is located above roller 29a, separated from roller 29a by less than the thickness of the anticipated card so that the card may be suitably grasped between rollers 29a and 32a. Similarly, roller 32b is located above roller 29b, separated from roller 29b by less than the thickness of an anticipated card so that the card may be suitably grasped between rollers 29b and 32b.

First driving roller 26 and first pressing roller 27 are located oppositely on either side of the card transporting passageway 7. The first pressing roller 27 has contact with the first driving roller 26, but the card is not damaged since the rubber ring is easily deformable.

Referring to the view of FIG. 3, the IC card handling device is explained. The IC card handling device 40 includes a card guiding unit 41 and an IC card reading and writing unit 42. The IC card reading and writing unit 42 can handle either contact or non-contact IC card types. The card guiding unit 41 comprises a channel-like shape, bounded by a pair of plates 44 and 45 which pivot on-the third rotating shaft 43 and are fixed at the side wall of baseboard 46. This channel extends along the card transporting passageway 7. The baseboard 46 is located slightly below the card transporting passageway 7. The end of rod 48 pivots on pin 47 which is fixed at plate 44.

The other end of rod 48 can pivot on shaft 51 of crank 50 which is fixed to the output shaft of motor 49 with gears. The moving unit 52 of the card guiding unit 41 includes pin 47, rod 48, motor 49 with gear, crank 50 and shaft 51. The moving unit 52 moves the card handling unit 40 away from alignment with the card transporting passageway 7. The motivating force for moving unit 52 may be either a linear motor, a pneumatic cylinder, or a solenoid. The IC card handling unit 40 may be moved parallel to the card transporting passageway 7.

A communication unit 53, comprising a thin antenna, for non-contact IC cards is fixed at moving plate 54 located above baseboard 46. The contactor 55 for contact type IC cards, is fixed at moving plate 54 above baseboard 46. The moving plate 54 can move along the card transporting passageway 7 a predetermined distance toward the side of the magnetic card handling unit 20. The moving plate 54 is pressed against the side of the magnetic card handling unit 20 by a spring (not shown) and is limited by a stopper (not shown) at the horizontal section of the guiding groove 56.

Referring to the view of FIG. 3, projection 57 is fixed at the end of the moving plate 54 which is opposite the magnetic card handling unit 20 and extends orthogonally into the card transporting passageway 7. The slanting surface 57b and opposite side 57a of projection 57 can move across the card transporting passageway 7.

Referring to the view of FIG. 3, the second transporting unit 60 is located between the magnetic card handling unit 20 and the IC card handling unit 40. The second transporting unit 60 includes a second driving roller 61 which is located below the card transporting passageway 7 and a second pressing roller 62 which is located above the card transporting passageway 7. The second driving roller 61 includes rollers 64a and 64b mounted on a second rotating shaft 63. The rollers 64a and 64b are similar to the rollers 29a and 29b.

The second rotating shaft 63 is supported on each end by side frame members 2 and 3 allowing rotation of the rotating shaft 63. Second pressing roller 62 includes rollers 66a and 66b which rotate on shaft 65. Rollers 66a and 66b are similar to rollers 32a and 32b. Shaft 65 is attached to the removable supporting box 30. Guiding board 67 is located above and below the card transporting passageway 7 between the card receiving unit 10 and the second transporting unit 60.

The guiding plate 69 is fixed at the under section of plates 44 and 45 which are located below the card transporting passageway 7. Bend section 69a is shaped continuously with guiding plate 69, a portion of the guiding plate, on the side away from the magnetic card handling unit, is bent downward. Thus, the guiding plate 69 has two sections, the unbended section of guiding plate 69 and the bended section 69a, which relatively planar surfaces yet which are not aligned in the same plane with each other. Referring to the view of FIG. 4, when the integrated circuit card handling unit 40 pivots at the third rotating shaft 43, the plane of the guiding plate 69 crosses the plane of the card transporting passageway 7 at an acute angle described by the initial and final positions of the integrated circuit handling unit 40 while pivoting. The plane of the downward bended section 69a crosses the plane of the transporting passageway at an angle which is larger than the acute angle at which the plane of the unbended section of the guiding plate 69 crosses the plane of the transporting passageway 7.

The recycling storage area 39 is located directly below the IC card handling unit 40. With this arrangement, the length of the card handling device 1 is shorter in length but taller in height. The third transporting unit 70 is located on the IC card handling unit 40 on the side opposite to the magnetic card handling unit 20.

The structure of the third transporting unit 70 is the same as that of the first transporting unit 25 and the second transporting unit 60. The third transporting unit 70 includes the third driving roller 71 which is located below the card transporting passageway 7. The third pressing roller 72 is located directly above the third driving roller and above the card transporting passageway 7.

The third driving roller 71 is rollers 74a and 74b which are fixed at the third rotting shaft 43. The third rotating shaft 43 is supported near each end by side frame members 2 and 3. The third pressing roller 72 includes rollers 76a and 76b which rotate on shaft 75. Rollers 76a and 76b are made of the same structure as rollers 32a and 32b. Shaft 75 is supported by side frame members 2 and 3.

The distance between the first transporting unit 25 and the second transporting device 60 is such that the card may be supported by both units. The distance between the second transporting unit 60 and the third transporting unit 70 is such that a card may be supported by the second driving roller 61 and second pressing roller 62, shortly after it passes through the third driving roller 71 and third pressing roller 72.

When a new card is dispensed to the rectangular card slot 11, a card dispensing device is mounted at the right side of the third transporting unit 70. If new cards are not dispensed, the third transporting unit 70 is not included in the card handling device 1, and only shaft 43 is included. The transporting unit 59 includes the first transporting unit 25 and the second transporting unit 60. If new cards are dispensed, the transporting unit 59 includes the third transporting unit 70. The function of the transporting unit 59 is to transport the card to a predetermined direction. The transporting unit 59 may be changed to a different type of moving elements such as a drive belt or other suitable technology.

Referring to the view of FIGS. 1 and 2, the driving unit 80 of the first transporting unit 25, the second transporting unit 60, and the third transporting unit 70 is explained. The timing pulley 83 is fixed on an output shaft 82 of motor 81 with a gear which is located below the card transporting passageway 7 between the second transporting unit 60 and the IC card handling unit 40.

Timing belt 86 functionally connects timing pulley 83 and timing pulley 84 which is mounted on the second rotating shaft 63. Timing belt 88 functionally connects timing pulley 84 and timing pulley 87 which is mounted on the second rotating shaft 28. The timing belt 90 functionally connects timing pulley 83 and timing pulley 89 which is mounted on the third rotating shaft 43. The first driving roller 26, the second driving roller 61, and the third driving roller 71 all rotate synchronously and at the same speed because the timing pulleys 83, 84, 87, and 89 are the same diameter. The driving unit 80 may be changed to another type which rotates the transporting unit 59 at the same speed.

The shutter unit 91 includes plate 92 which is located between the card receiving unit 10 and the first transporting unit 25 and solenoid 93 which moves plate 92. When the card handling device 1 is active, plate 92 is located outside of the card transporting passageway 7. After a card is inserted into the card receiving unit 10, the second sensor 95, which is located between the first transporting unit 25 and the second transporting unit 60 gets a non-detection situation, plate 92 protrudes into the card transporting passageway 7.

When the second sensor 95 detects the card again, plate 92 is moved and goes out of the card transporting passageway 7. The first sensor 96 and second sensor 95 are photo-electrical type in the embodiment, but may be another type with similar functionality.

Next, the operation of the card handling device 1 is explained. First, the handling of a magnetic card is explained. When the card handling device 1 is active, and a card isn't inserted, plate 92 is located outside the card transporting passageway 7. When a card C is inserted into the rectangular card slot 11 and is moved into the card transporting passageway 7, it is detected by the first sensor 96. Upon detection, motor 81 starts and rotates the first transporting unit 25, the second transporting unit 60, and the third transporting unit 70, operated through the driving unit 80.

Referring to the view of FIG. 3, when the card handling device 1 is first activated, the first driving roller 26, the second driving roller 61, and the third driving roller 71 are rotated in the clockwise direction. Card C is held between the first driving roller 26 and the first pressing roller 27 and thereby transported towards the right when the driving rollers 26, 61, and 71 are rotated in the clockwise direction. In this moving process, card C moves between the first magnetic head 21 and the second magnetic head 22 and moves between the second driving roller 61 and the second pressing roller 62. The first magnetic head 21 reads the data on the JIS-1 type. The second magnetic head 22 reads the data on the JIS-2 type.

Card C is further transported to the right by the second transporting unit 60. The end of card C arrives in the IC card reading and writing unit 42. When the first sensor 96 ceases detecting card C, plate 92 is moved into the card transporting passageway 7 by solenoid 93, and theft is prevented.

The leading end of card C makes contact with the end face 57a of projection 57, and moving plate 54 is moved towards the right by card C. When the trailing end of card C passes through the second sensor 95, the second sensor 95 becomes non-detecting of card C. Motor 81 is stopped based on the end of the detection condition. In this situation, the moving plate 54 moves to the standby position by card C (shown in solid line of FIG. 3). The trailing end of card C is held by the second driving roller 61 and the second pressing roller 62. In this standby situation of card C, a main device handles a predetermined operation, and afterwards it outputs a returning signal.

Motor 81 is reversed based on the returning signal, and the first driving roller 26, the second driving roller 61, and the third driving roller 71 rotate in the counter clockwise direction through driving unit 80. Therefore, card C is transported in the direction of the rectangular card slot 11 by the second transporting unit 60. On the way, card C moves between the first magnetic head 21 and the second magnetic head 22 and is securely transported by the first transporting unit 25 to the opening of the rectangular card slot 11 in the card receiving unit.

In this process, either or both of the first magnetic head 21 or the second magnetic head 22 may write onto magnetic card C. When the first sensor 96 detects the end of card C, solenoid 93 is excited, and plate 92 is moved to the outside of the card transporting passageway 7. Also, card C is transported towards the rectangular card slot 11. Card C is drawn out from card slot 11, and when the first sensor 96 indicates a non-detection condition, the motor 81 is stopped.

Next, the handling of an integrated circuit card, or IC card, is explained. Integrated circuit card C is inserted into the rectangular card slot 11 and is transported towards the integrated circuit card handling unit along the card transporting passageway 7 by the first transporting unit 25 and the second transporting unit 60. Therefore, moving plate 54 is kept at the standby position. In this situation, a contactor of the non-contact type integrated circuit card connects with contactor 55. When the contact type IC card is used, data is recorded using the communication unit 53.

The integrated circuit card is handled for reading, writing, or both. When the card access is completed, the returning signal is asserted. Motor 81 is then reversed, and the first driving unit 26, the second driving roller 61, and the third driving roller 71 all rotate in the counter-clockwise direction through driving unit 80. Therefore, the card C is transported towards the rectangular card slot 11 by the second transporting unit 60 and the first transporting unit 25.

Next, recycling of the card C is explained. The process is started after the card C reaches the standby position. When the recycling signal is received by the control unit, the motor 81 is reversed. Card C is then transported towards card slot 11 by second transporting unit 60 and first transporting unit 25. When first sensor 96 detects the presence of card C, motor 81 is stopped.

Next, motor 49 rotates which causes the card guide 41 to pivot in the clockwise direction on third rotating shaft 43 as shown in FIG. 3 through output shaft 51 together rotation of crank 50, rod 48 and pin 47, causing the card guide 41 to rise as shown in FIG. 4.

The completed upward motion of card guide 41 is then detected by a sensor on plate 45 (not shown), and the sensor outputs a detecting signal. Motor 49 is stopped based on the detecting signal. Therefore, plane of the guiding plate 69 crosses the plane of the card transporting passageway 7.

Afterwards motor 81 rotates, and card C is transported towards the right as shown in FIG. 3. Therefore card C is guided by guiding plate 69 and slants to the right and falls down into a recycling section 39 outside of the second transporting device 60. The transported card is deflected into the recycling section 39 by striking the lower surface of the guiding elate 69. In this situation, card C is forcibly diverted downwards because the cross angle of the bend section 69a is larger. The card naturally falls however the transporting section is short. A storing device of cards is located at the recycling storage area 39 (not shown).

The control unit waits a predetermined amount of time based on the time required for card C to fall into the recycling storage area 39, afterwards motor 81 is stopped. Next, motor 49 rotates, output shaft 51 moves downwards together the rotation of crank 50. On the other hand, IC card handling device 40 rotates in the counter clockwise direction and becomes level as shown in FIG. 3 and is detected by a sensor (not shown), and motor 49 is stopped.

Next, dispensing a new magnetic card is explained. A new card is transported from a card storing section (not shown) which is located to the side of the third transporting unit 70 adjacent to the integrated card handling unit, on a line opposite from the magnetic card handling unit. The new card is transported towards card slot 11 by the third transporting unit 70.

As the new card is traveling along the card transporting passageway, the end of the new card pushes the slanting surface 57B. The moving plate 54 moves along transporting passageway 7 afterwards it is guided by a slanting section of guiding groove 56 and is pushed away from transporting passageway 7. Thus, the projection 57 is away from transporting passageway 7, and the new card passes through under projection 56. Afterwards, the card passes through the second transporting device 60 and the first transporting device 25 to be dispensed from card slot 11. When first sensor 96 indicates the card is not detected, the motor 81 is stopped, and dispensing of the new card finishes. In the process, the new card is recorded by either of or both the first magnetic head 21 and second magnetic head 22.

Next, dispensing a new integrated circuit card is explained. A new integrated circuit card is transported towards card slot 11 by the third transporting device 70, the second transporting device 60, and the first transporting device 25. When the first sensor 96 detects the presence of the new integrated circuit card, motor 81 is stopped and then starts again. As has been previously described, the new integrated circuit card pushes the projection 57 and is kept at the standby position and for recording data, afterwards it is dispensed towards card slot 11.

In an alternative embodiment, the order of the magnetic card handling unit 20 and the integrated circuit handling unit 40 may be interchanged so that the magnetic card handling unit pivots to block the card transport passageway 7 to similarly divert a card from the transport unit into the recycling storage area 39.

An external control unit receives the signals from the sensors and operates the solenoid, the driving unit 80, and the motors 49 and 81.

What is claimed is:

1. A card handling and recycling device, comprising:
   a card receiving unit, wherein the card receiving unit can accept a card inserted into the device and optionally withdraw the card out of the device;
   a magnetic card handling unit including a magnetic card reading and writing unit;
   a movable integrated circuit card handling unit disposed adjacent to the magnetic card reading and writing unit and including an integrated circuit card reading and writing unit, the integrated circuit card handling unit being movable pivotally on an end opposite the magnetic card reading and writing unit;
   a card transporting unit for selectively moving the card within the card handling device along a transporting passageway, the card receiving unit, magnetic card reading and writing unit, movable integrated circuit card handling unit, and card transporting unit being aligned along the transporting passageway, and
   a guiding plate, suitably attached to the bottom of the integrated circuit card handling unit, such that when the integrated circuit card handling unit is pivoted, the plane of the guiding plate crosses the plane of the transporting passageway at an acute angle described by the initial and final positions of the integrated circuit card handling unit while pivoting, wherein the guiding plate includes a downward bended section continuous to the guiding plate, so that the plane of the downward bended section crosses the plane of the transporting passageway at an angle which is larger than the acute angle at which the plane of the unbended section crosses the plane of the transporting passageway.

2. The card handling and recycling device of claim 1, wherein the card transporting unit includes
a first transporting unit which is located between the card receiving unit and the magnetic card handling unit, and
a second transporting unit which is located between the magnetic card handling unit and the integrated circuit card handling unit.

3. The card handling and recycling device of claim 1, wherein the guiding plate is suitably configured to deflect a transported card into a recycling storage area as the transported card strikes the lower surface of the guiding plate when the integrated circuit card handling unit is pivoted.

4. A card handling and recycling device, comprising:

a card receiving unit, wherein the card receiving unit can accept a card inserted into the device and optionally withdraw the card out of the device;

a magnetic card handling unit;

an integrated circuit card handling unit being movable pivotally on an end opposite the magnetic card handling unit;

a card transporting unit for selectively moving the card within the card handling device along a transporting passageway, the card transporting unit including a first transporting unit disposed between the card receiving unit and the magnetic card handling unit, the card transporting unit including a second transporting unit disposed between the magnetic card handling unit and the integrated circuit card handling unit; and a guiding plate, suitably attached to the bottom of the integrated circuit handling unit, such that when the integrated circuit handling unit is pivoted, the plane of the guiding plate crosses the plane of the transporting passageway at an acute angle described by the initial and final positions of the integrated circuit card handling unit while pivoting, wherein the guiding plate includes a downward bended section continuous to the guiding plate, so that the plane of the downward bended section crosses the plane of the transporting passageway at an angle which is larger than the acute angle at which the plane of the unbended section crosses the plane of the transporting passageway, and wherein the second transporting unit transports a card towards the guiding plate and continues to move to the downward bended section.

5. The card handling and recycling device of claim 4, further comprising:

a recycling storage area for receiving recycled cards, the guiding plate being suitably configured to deflect a transported card into the recycling storage area as the transported card strikes the lower surface of the guiding plate when the integrated circuit card handling unit is pivoted.

* * * * *